(No Model.)
R. S. TAYLOR & M. M. M. SLATTERY.
AUTOMATIC SYNCHRONIZING COMMUTATOR.
No. 411,840. Patented Oct. 1, 1889.
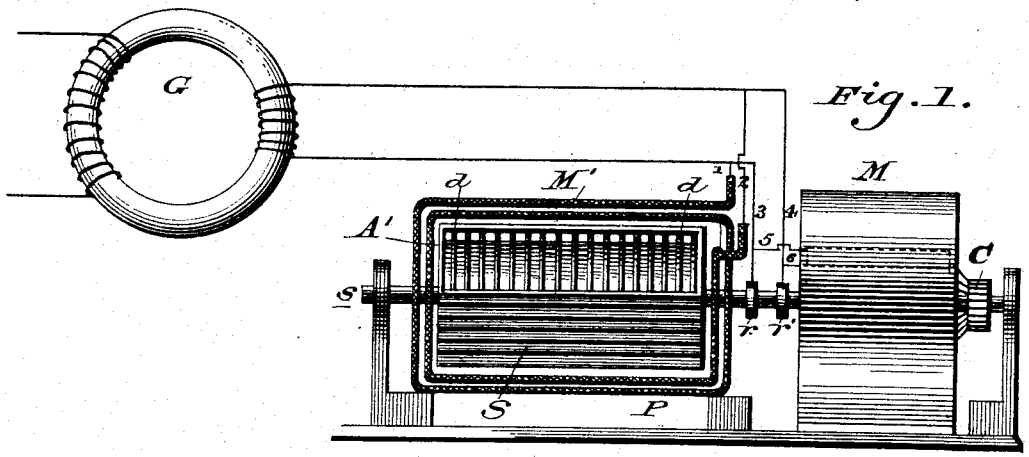
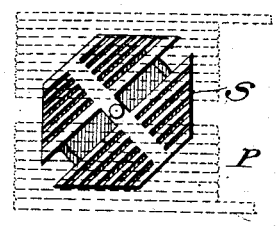
Fig. 3.
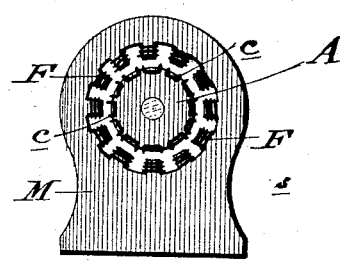
Fig. 2.
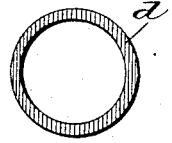
Fig. 4.
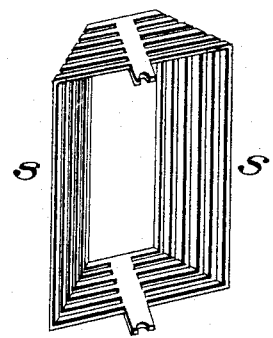
Fig. 5.
WITNESSES:
P. F. Nagle.
Herbert T. Hartman.
INVENTORS
Robert S. Taylor
Marmaduke M. M. Slattery

UNITED STATES PATENT OFFICE.

ROBERT S. TAYLOR AND MARMADUKE M. M. SLATTERY, OF FORT WAYNE, INDIANA.

AUTOMATIC SYNCHRONIZING-COMMUTATOR.

SPECIFICATION forming part of Letters Patent No. 411,840, dated October 1, 1889.

Application filed June 26, 1889. Serial No. 315,614. (No model.)

*To all whom it may concern:*

Be it known that we, ROBERT S. TAYLOR and MARMADUKE M. M. SLATTERY, citizens of the United States, residing at Fort Wayne, in the county of Allen, in the State of Indiana, have invented certain new and useful Improvements in Automatic Synchronizing-Commutators; and we do hereby declare that the following is a full, clear, and exact description of the invention, which will enable others skilled in the art to which it appertains to make and use the same, reference being had to the accompanying drawings, which form part of this specification.

Our invention is of an automatic commutator or pole-changer designed to be placed in the circuit of an alternating electric current for the purpose of transforming it to a continuous current.

In the drawings, Figure 1 represents a side view of the apparatus; Fig. 2, an end view of the field-coils and armature of the synchronizing-motor; Fig. 3, an end view of the induction or starting motor, and Figs. 4 and 5 details of the same.

The motor M is designed to operate synchronously with the dynamo by which the alternating current is generated. The most convenient way to secure this manner of operation is to make it a reproduction on a very small scale of the generating-dynamo in respect to the number, connections, and relations of its field poles and coils, and armature and armature-coils. By this construction the armature of the motor M may be made to maintain an exact synchronism with the armature of the dynamo in its revolution. Such a construction is indicated in Fig. 2, in which F F are the field-coils, A the armature, and c c the armature-coils, which are laid flat upon the circumference of the drum-shaped armature.

At C in Fig. 1 is shown the commutator, which has as many sections as there are coils on the armature, and which are connected up with the armature-coils as though the motor were a dynamo to be used in generating a continuous current. To this commutator brushes or collectors may be applied in the usual manner.

The motor M' is an induction-motor designed to produce initial motion in the motor M and bring the revolution of the armature A up to synchronism with the dynamo generating the current. It comprises a fixed primary coil P, a fixed secondary closed coil or conductor S, placed in inductive relation with the primary coil P, and with its central plane cutting the plane of the primary coil P at an angle preferably of forty-five degrees, and a moving part A', mounted upon the shaft s, which is common to both motors M and M', and occupies the line of intersection of the planes of the coils P and S, which moving part is caused to rotate by induction from the coils P and S. This moving part, which may be called an "armature," may be constructed in any manner adapted to secure energy of rotation. The form which we have shown and which is the best known to us consists of a copper cylinder having soft-iron disks or rings mounted upon its circumference. Part of the surface of this cylinder with its disks *d d* is shown at A' in Fig. 1, and one of the disks or rings is shown at Fig. 4. The secondary coil or conductor S may be in any form that will afford a path of low resistance for the currents generated in it by induction from the coil P. The form which we have shown and which is the best known to us consists of a series of ribs joined by a mid-rib enveloping the moving part. A convenient way of making this form is to join together two shells having their sides sawed into ribs supported by the mid-rib, as shown in Fig. 5.

The most convenient and useful application of this pole-changer is in the secondary circuit of a converter or secondary generator, as shown conventionally at G in Fig. 1. The main current, which is to be transformed to a continuous current, is conducted through the armature A by the wires 3 and 4 and rings *r r'*. By the wires 1 and 2 a portion of the current is taken through the coil P and another portion by the wires 5 and 6 through the field-coils F F. As the motor has no work to do except to run the commutator C, the energy expended in it is very little and it can be made of very low resistance. In starting the pole-changer the synchronizing-motor is cut out until its armature attains speed sufficient to fall into step with the dynamo.

We claim—

1. An automatic pole-changer comprising in combination an alternating motor adapted to run synchronously with the dynamo generating the current to be commuted and carrying upon its armature-shaft the commutator through which the commutation is effected, and an induction-motor for obtaining initial motion of the armature of the synchronizing-motor.

2. An automatic pole-changer comprising in combination an alternating-current motor adapted to run synchronously with the dynamo generating the current to be commuted and carrying upon its armature-shaft a commutator connected up with its armature-coils in such manner that the current to be commuted shall pass through said armature-coils and be transformed into a continuous current by said commutator, and an induction-motor to produce initial revolution of the synchronizing-armature.

3. An automatic pole-changer consisting of two motors having a common shaft, one of them being an induction-motor for initial action and the other an alternating-current motor adapted to operate synchronously with the dynamo generating the current to be commuted, and carrying upon its armature-shaft a commutator through which the commutation is effected.

In testimony whereof we do hereto subscribe our names, in the presence of two witnesses, this 20th day of June, A. D. 1889.

ROBERT S. TAYLOR.
MARMADUKE M. M. SLATTERY.

Witnesses:
J. E. TALBOT,
ROBB MACKIE.